United States Patent
Kong

(10) Patent No.: US 7,524,472 B1
(45) Date of Patent: Apr. 28, 2009

(54) MERCURY REMOVAL FROM COAL EMISSIONS USING MONTMORILLONITE CLAY

(75) Inventor: Raymond Kong, Los Angeles, CA (US)

(73) Assignee: California Earth Minerals, Corp., Culver City, CA (US)

(*) Notice: Subject to any disclaimer, the term of this patent is extended or adjusted under 35 U.S.C. 154(b) by 159 days.

(21) Appl. No.: 11/600,700

(22) Filed: Nov. 15, 2006

(51) Int. Cl.
*B01D 53/64* (2006.01)
*B01J 20/12* (2006.01)
*C09K 3/00* (2006.01)

(52) U.S. Cl. .................. 423/210; 502/400; 252/181.1; 252/181.3; 252/181.6; 252/182.32; 252/182.35; 252/183.13; 252/183.14; 95/134

(58) Field of Classification Search .............. 502/400; 423/210; 422/168, 177; 252/181.1, 181.3, 252/181.6, 182.32, 182.35, 183.13, 183.14; 95/134

See application file for complete search history.

(56) References Cited

U.S. PATENT DOCUMENTS

| | | | |
|---|---|---|---|
| 4,167,481 A | | 9/1979 | Cremers et al. |
| 4,902,662 A | * | 2/1990 | Toulhoat et al. ............ 502/216 |
| 5,017,349 A | | 5/1991 | Davis et al. |
| 5,037,450 A | | 8/1991 | Keener et al. |
| 5,397,500 A | | 3/1995 | Lee |
| 5,512,526 A | | 4/1996 | Greco |
| 5,659,110 A | | 8/1997 | Herden et al. |
| 5,695,726 A | * | 12/1997 | Lerner ........................ 423/210 |
| 5,747,403 A | * | 5/1998 | Boyd et al. .................... 502/62 |
| 5,880,060 A | | 3/1999 | Blake et al. |
| 6,214,308 B1 | | 4/2001 | Keener et al. |
| 6,719,828 B1 | * | 4/2004 | Lovell et al. ................. 95/134 |
| 7,048,781 B1 | * | 5/2006 | Lovell ......................... 95/134 |
| 2006/0057044 A1 | | 3/2006 | Chang et al. |
| 2007/0119300 A1 | * | 5/2007 | Yang et al. .................... 95/107 |
| 2007/0122327 A1 | * | 5/2007 | Yang et al. .................. 423/210 |
| 2007/0140940 A1 | * | 6/2007 | Varma et al. ............. 423/215.5 |

OTHER PUBLICATIONS

Joo-Youp Lee, Yuhong Ju, Tim C. Keener, and Rajender S. Varma; Development of Cost-Effective Noncarbon Sorbents for Hg0 Removal from Coal-Fired Power Plants; Environmental Science Technology / vol. 40, No. 8, 2006; 7 Pages; American Chemical Society, Mar. 15, 2006.

Yao Shi, David Littlejohn, and Shih-Ger Chang; Integrated Tests for Removal of Nitric Oxide with Iron Thiochelate in Wet Flue Gas Desulfurization Systems; Environmental Science Technology / vol. 30, No. 11, 2006; 6 Pages; American Chemical Society, 1996.

Shih-Ger Chang, David Littlejohn, and Scott Lynn; Effects of Metal Chelates on Wet Flue Gas Scrubbing Chemistry; Environmental Science Technology / vol. 17, No. 11, 1983; 5 Pages; American Chemical Society, 1983.

(Continued)

*Primary Examiner*—Timothy C Vanoy
(74) *Attorney, Agent, or Firm*—Andrew D. Fortney

(57) ABSTRACT

Disclosed herein are methods, apparatus, and compositions for removing mercury gas from coal combustion emissions and the like. Disclosed herein is a gettering composition comprising an activated montmorillonite clay, a method for removing mercury from a gas stream using the gettering composition, and an apparatus for removing mercury from a gas stream.

19 Claims, 1 Drawing Sheet

OTHER PUBLICATIONS

Sang-KWun Lee, Xiaolin Jiang, Tim C. Keener, and Soon J. Khang; Attrition of Lime Sorbents during Fluidization in a Circulating Fluidized Bed Absorber; Ind. Eng. Chem. Res. 1993, 32, 2758-2766; American Chemical Society, 1993.

Joo-Youp Lee, Soon-Jai Khang, Tim C. Keener; Mercury Removal from Gas with Particles Generated by SO3-NH3 Reactions; Ind. Eng. Chem. Res. 2004, 43, 4363-4368; American Chemical Society, 2004.

M.F. Brigatti, S. Colonna, D. Malferrari, L. Medici, and L. Poppi; Mercury adsorption by Montmorillonite and Vermiculite: a Combined XRD, TG-MS, and EXAFS Study; Applied Clay Science 28 (2005) 1-8; Elsevier Science 2004.

M.X. Jiang, T.C. Keener, and S.J. Khang; The Use of a Circulating Fluidized Bed Absorber for the Control of Sulfur Dioxide Emissions by Calcium Oxide Sorbent Via in Situ Hydration; Power Technology 85 (1995) 115-126; Elsevier Science 1995.

Changfa Wu, Soon-Jai Khang, Tim C. Keener, and Sang-Kwun Lee; A Model for Dry Bicarbonate Duct Injection Flue Gas Desulfurization; Advances in Environmental Research 8 (2004) 655-666; Elsevier Science 2003.

Jeffrey L. Cook, Soon-Jai Khang, Sang-Kwun Lee, and Tim C. Keener; Attrition and Changes in Particle Size Distribution of Lime Sorbents in a Circulating Fluidized Bed Absorber; Power Technology 89, (1996) 1-8; Elsevier Science, 1996.

Amy C. Merdes, Tim C. Keener, Soon-Jai Khang, and Robert G. Jenkins; Investigation into the Fate of Mercury in Bituminous Coal During Mild Pyrolysis; Fuel vol. 77, No. 15, pp. 1783-1792, 1998; Elsevier Science, 1998.

Min Wang, Tim C. Keener, and Soon-Jai Khang; The Effect of Coal Volatility on Mercury Removal from Bituminous Coal During Mild Pyrolysis; Fuel Processing Technologly 67 (2000) 147-161; Elsevier Science, 2000.

John F. Sanders, Tim C. Keener, and Jun Wang; Heated Fly Ash/ Hydrated Lime Slurries for SC2 Removal In Spray Dryer Absorbers; Ind. Eng. Chem. Res. 1995, 34, 302-307; American Chemical Society, 1995.

Joo-Toup Lee, Yuhong Ju, Tim C. Keener and Rajender S. Varma; "Development of Cost-Effective Noncarbon Sorbents for Hg0 Removal from Coal-Fired Power Plants"; Environment Science & Technology; pp. 2714-2720; vol. 40, No. 8; 2006; American Chemical Society, U.S.

Philip H. Taylor, Rajesh Mallipeddi and Takahiro Yamada' "LP/LIF Study of the Formation and Consumption of Mercury (I) Chloride: Kinetics of Mercury Chlorination", Chemosphere; pp. 685-692; vol. 61; 2005; Elsevier Ltd.

\* cited by examiner

MERCURY REMOVAL FROM COAL EMISSIONS USING MONTMORILLONITE CLAY

FIELD OF THE DISCLOSURE

The present disclosure relates generally to removal of mercury from exhaust gases from coal combustion or other industrial processes. More particularly, the present invention relates to a gettering composition for the removal of mercury, an apparatus for removing mercury from coal combustion exhaust gases and methods for using the same.

DISCUSSION OF THE BACKGROUND

Emissions created by the combustion of coal contribute roughly a third of the anthropogenic mercury introduced into the atmosphere each year. Once in the atmosphere, the mercury forms soluble compounds and is deposited by rain in terrestrial and aquatic environments. Once in these environments, it can be transformed by environmental reactions or by bacteria and animals into highly toxic methyl mercury (MeHg). The presence of MeHg is much more prominent in aquatic environments and tends to bioaccumulate in aquatic food webs. People and animals can be exposed to toxic levels of MeHg by eating contaminated fish. Toxic exposure can affect numerous physiological functions including immune function, genetic/enzymatic function, and neurological function and development. The consequences of increased levels of toxic mercury species in the environment are of great concern, yet anthropogenic production of mercury continues to increase.

Many different adsorbents have been tested for use in mercury removal technologies for exhaust gases. Activated carbon, though relatively expensive, is currently the most effective and commonly used adsorbent. However, the U.S. Environmental Protection Agency (EPA), the energy industry, and other interests are still searching for more cost-effective and efficient solutions.

Given the state of coal plant technology, there is a need to develop lower cost and/or more efficient technology options that will permit the effective use of the existing coal plant utilities while meeting environmental regulations. The present invention provides a clay-based adsorbent and a method for using the adsorbent that offers an efficient, abundant, recyclable, and low-cost alternative to the current methods.

SUMMARY OF THE INVENTION

The preferred embodiments of the present invention include a mercury gettering composition comprising an activated montmorillonite clay, a scrubbing apparatus including an adsorbent bed comprising the gettering composition, and a method of removing gaseous mercury from a flue gas exhaust stream using the gettering composition. The montmorillonite clay may be activated by inorganic sulfur compounds, sulfur-containing organic cations, or acidification.

It is an object of the present invention to provide a gettering composition comprising an activated montmorillonite clay. The activator may comprise protons ($H^+$ ions), organic cations or sulfur compounds.

It is a further object of the present invention to provide a scrubbing apparatus for the removal of mercury contained in the coal-combustion gases. The scrubbing apparatus includes a chamber placed within a flue or duct, through which coal-combustion exhaust passes. Within the chamber are adsorption columns containing a gettering composition comprising montmorillonite clay for removing mercury from the exhaust gas.

It is a further object of the present invention to remove mercury from a gas stream by contacting the gas stream with a gettering composition comprising an activated montmorillonite clay contained within a scrubbing apparatus as the gas stream passes through a flue or duct.

The present invention provides a new, efficient method of removing mercury from the exhaust gases of a coal combustion process. Mercury in the exhaust gas is contacted with a sorbent material, wherein the sorbent material comprises a chemically activated montmorillonite clay. The mercury adsorption efficiency of montmorillonite clay can be improved, among other techniques, by adding sulfur-containing compounds to the surface of the clay or leaching metal ions from the clay by acidification. The contact results in the adsorption of mercury to the sorbent material.

In accordance with the present invention, there is provided a system for the removal of mercury contained in the flue gases emanating from a coal combustion source through the means of adsorption to chemically activated montmorillonite clay. The present invention provides a clay-based adsorbent and a method for using the adsorbent that offers an efficient, abundant, recyclable, and low-cost alternative to the current methods.

DETAILED DESCRIPTION OF THE PREFERRED EMBODIMENTS

Figure 1:
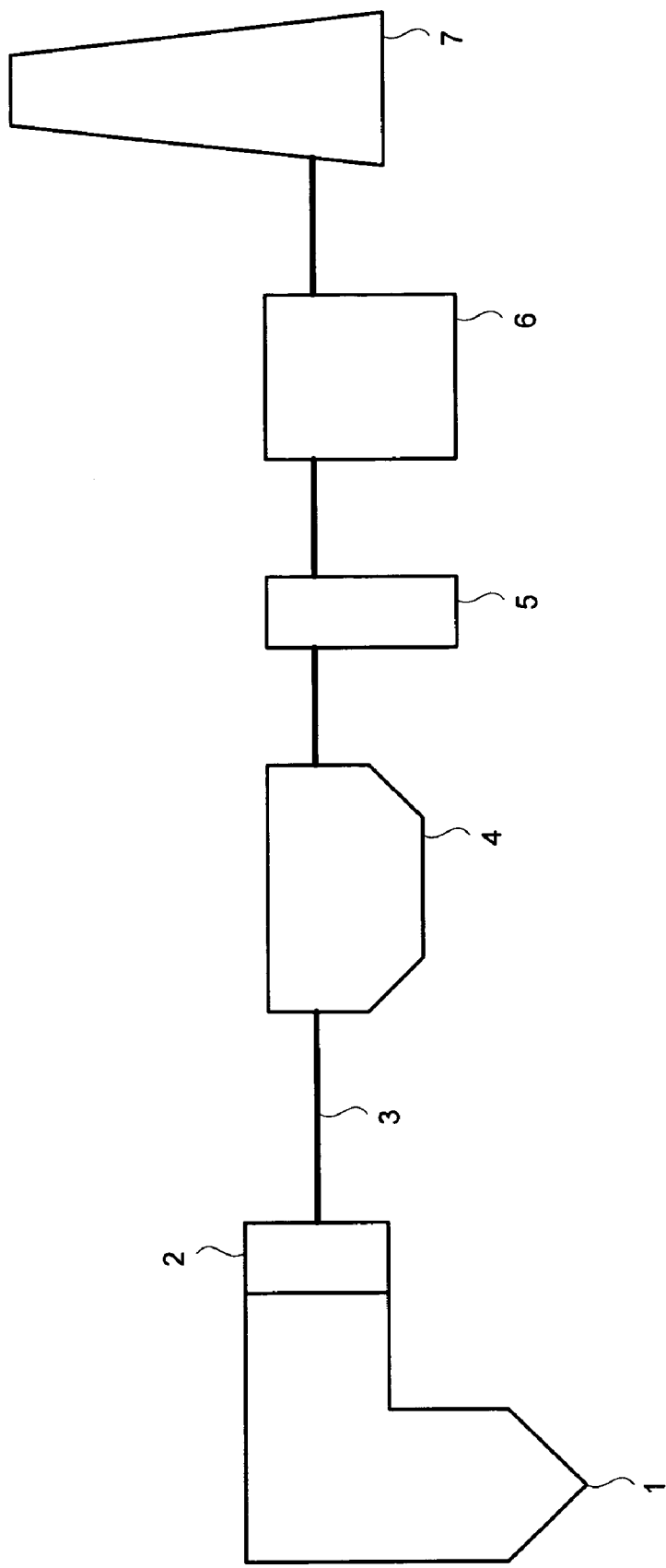
FIG. 1 is a schematic diagram according to a preferred embodiment of the invention, showing an exemplary mercury adsorbent bed for removing mercury from a flue gas exhaust stream.

Coal-fired utilities emit several different forms of mercury, including elemental mercury, soluble mercury, mercuric chloride, and mercuric oxide. Mercury is emitted predominantly in the vapor-phase in two forms: elemental mercury vapor ($Hg^0$) or reactive gaseous mercury (e.g., airborne oxidized mercury, or $Hg^{2+}$). The proportions of these species in emissions depend on the characteristics of the type of coal and on the method of combustion. The majority of gaseous mercury in bituminous coal-fired boilers is $Hg^{2+}$. The majority of gaseous mercury produced in the combustion of subbituminous and lignite coals is $Hg^0$.

Alumino-silicate clays have shown promise as adsorbents for metal species (as well as other chemical species, including toxins and pollutants) from such combustion emissions. Alumino-silicate clays have a high ion exchange capacity and a porous, layered molecular structure providing a large surface area-to-volume or surface area-to-mass unit ratio. Toxic heavy metal cations, such as mercury, can easily exchange with cations of innocuous elements such as sodium and calcium that are normally found in or bound to clay particles. The alumino-silicates provide large surface areas for this ion exchange activity. Heavy metals may complex with chemical groups of the alumino-silicates.

Montmorillonite (general formula: $Al_2O_3 \cdot 4SiO_2 \cdot xH_2O$), also known as smectite, bentonite, or Fuller's Earth, is an alumino-silicate mineral clay, mostly containing silica ($SiO_2$) and alumina ($Al_2O_3$). Montmorillonite generally has a molecular construction based on an alumina octahedral sheet, having Al—$O^-$ groups therein, situated between silica tetrahedral sheets (having Si—$O^-$ groups therein). Cations from a surrounding fluid tend to intercalate into the interlayer areas, balancing charges between the clay and the surrounding fluid. The exchange of cations is facilitated by pores running from the surface through the interlayer areas. The resulting high cation exchange capacity (80-150 mEq/100 g) in montmorillonite clays gives them a high surface reactivity for metals and metal ions, including mercury species. The pores in the montmorillonite particles are large enough to accommodate mercury and retain it therein. The particle size of montmorillonite clay can be as small as roughly 1 micrometer. The availability of the interlayer areas through pores and their very small particle size lead to these clays having extremely large effective surface areas.

The present invention relates to a gettering composition for adsorbing gaseous mercury, a scrubbing apparatus, and a method for removing mercury from combustion emissions. The gettering composition comprises a montmorillonite clay, activated by sulfur-containing compounds. The scrubbing apparatus comprises a chamber placed within a flue or duct, through which coal-combustion exhaust passes. Within the chamber are adsorption columns containing a gettering composition comprising chemically activated montmorillonite clay for removing mercury from the exhaust gas. The method for removing mercury from a gas stream comprises contacting the gas stream with the gettering composition as the gas stream passes through a flue or duct. According to the invention, mercury is removed from coal combustion exhaust gases by adsorption as it contacts the gettering composition comprising the chemically activated montmorillonite clay. Although the exhaust gas treated in accordance with the present invention is preferably from coal combustion, other gas streams from a number of industrial sources may be treated with the present invention. These sources include, but are not limited to, emissions from natural gas combustion and waste incineration facilities.

An Exemplary Gettering Composition

A preferred embodiment of the present invention is a gettering composition comprising montmorillonite clay and an activator. The activator is selected to improve the mercury adsorption of the gettering composition. The activator is preferably a sulfur-containing organic cation or sulfur-containing inorganic compound.

The gettering composition acts as a mercury adsorbent for use in the removal of vapor-phase mercury from coal combustion exhaust gases. The adsorbent composition includes montmorillonite clay. The composition may contain 5%-80% montmorillonite clay. The clay may be combined with other materials including, but not limited to, other adsorbents (e.g., humic acid, other zeolite clays, or other silicates) and chemical activators (e.g., sulfur compounds and oxidizing agents).

Montmorillonite has a higher affinity for the cation $Hg^{2+}$ than $Hg^0$. The chemical groups on the surface of montmorillonite clay can catalyze the oxidation of $Hg^0$ to $Hg^{2+}$, resulting in the $Hg^{2+}$ bonding to the surface of the montmorillonite.

Sulfur groups readily react with and chemically bind $Hg^0$ and other mercury species. Mercury species have a great attraction to the sulfur-containing groups, e.g., sulfhydryls. The mercury species are chelated by the sulfur-containing groups.

The efficiency of adsorption of mercury by Montmorillonite can be improved by adding sulfur-containing chemical groups to the clay's surface. Inorganic sulfur compounds (e.g., sulfur, sodium sulfide, and sodium polysulfide) or organic cations having sulfur groups (e.g., L-cysteine ethyl ester cation, L-cysteine dimethyl ester cation, and a thiamine cation) may be added to the clay by methods described below.

Exemplary Method for Activating an Adsorbent

It is a preferred embodiment of the present invention to activate montmorillonite clay by adding sulfur compounds to the clay. Inorganic sulfur compounds (e.g., sulfur, sodium sulfide, and sodium polysulfide) may be added to the clay by mixing a solution of the activator with a suspended solution of montmorillonite and agitating the mixture under heat (e.g., 45 to 50° C.). The activated montmorillonite is then dried under heat. Alternatively, the activator solution may be sprayed onto a heated montmorillonite solid so that the water of the solution is evaporated and a dry activated montmorillonite remains. The montmorillonite may also be activated by treatment with solution of organic cations having sulfur groups (e.g., L-cysteine ethyl ester cation, L-cysteine dimethyl ester cation, and a thiamine cation).

Alternatively, the montmorillonite may also be activated by acidification. Bathing the montmorillonite in acid (e.g., HCl, HF, or other strong acids) leaches metal ions from the alumina octahedral layer and removes impurities from the clay. Acidification also increases the number of available adsorption sites for mercury species, the surface area of the montmorillonite particles, and the pore size of the particles. Thus, in one embodiment, the activated montmorillonite clay may comprise a metal ion-depleted montmorillonite, in which at least 50%, 80%, 90%, 95% or more of the sodium and/or calcium ions in native (e.g., inactivated or "natural") montmorillonite are replaced with hydrogen ions ($H^+$).

Exemplary Apparatus for Removing Mercury from Combustion Gases

It is another object of this invention to provide a scrubbing apparatus to remove mercury from a coal combustion exhaust gas stream. The apparatus comprises a chamber configured for placement in a flue or duct and adapted for the passage of the exhaust gas. An adsorption column is included within the chamber. The adsorption column contains a gettering composition comprising a montmorillonite clay, which acts as an adsorbent to remove mercury from the exhaust gas.

The adsorption columns consist of fixed beds containing a chemically activated montmorillonite clay. FIG. 1 shows the placement of the fixed bed apparatus 6 in a flue gas duct 3 of a coal-fired combustion apparatus, such as a boiler 1. The montmorillonite adsorbent may be packed into a single or multiple fixed bed columns in a single chamber or multiple chambers 6. The chamber(s) 6 are generally continuous with the flue gas duct 3. Uniform packing of the adsorbent within the columns may be advantageous to ensure uniform pressure change, pressure flow, and residence time through each tube.

The fixed bed columns may have a particulate layer of montmorillonite clay, where the particle size is about 10-50 micrometers, e.g., 25 micrometers. Alternatively, to minimize a pressure drop in the bed, the sorbent may be structured in pellet, bead, plate, monolith, or other forms. The sorbent structures can be porous or non-porous.

Alternatively, fluidized bed columns may be substituted for the fixed bed columns. The activated montmorillonite clay, having a particle size of about 10-50 micrometers, e.g., 25 micrometers, may be in a gas-solid suspension in circulating fluidized bed columns. The fluidized bed columns can be placed within a chamber located within a flue or duct, as described above.

Additionally, the circulating fluidized bed apparatus may alternatively have a gas-fluid-solids suspension of particulate montmorillonite clay (particle size of about 10-50 micrometers, e.g., 25 micrometers). In this embodiment, the montmorillonite is suspended in an oxidizing solution. The oxidizing solution converts $Hg^0$ in the flue gas to $Hg^{2+}$, facilitating more efficient adsorption of the mercury by the montmorillonite.

Exemplary Method for Removing Mercury from Combustion Gases

It is another object of this invention to provide a method of removing mercury from a gas stream by introducing the gas stream into a flue or duct, and contacting the gas stream with a gettering composition comprising a montmorillonite clay. The gettering composition preferably comprises a chemically activated montmorillonite clay, wherein the clay is activated by a sulfur-containing organic cation or a sulfur containing inorganic compound. Preferably, the gettering composition is packed within fixed bed columns adapted for the passage of coal combustion exhaust gas. As the exhaust gas is passed through the fixed bed columns, gaseous mercury species within the exhaust gas are adsorbed by the gettering composition. As a result, the exhaust gas leaving the fixed bed columns is substantially free from gaseous mercury species.

FIG. 1 shows a duct work apparatus through which exhaust gas flows. The fixed bed apparatus described above is placed within the duct work for the purpose of removing vapor-phase mercury from the exhaust gas as it flows through the duct work. An inlet gas stream flows past the activated montmorillonite in the fixed bed where vapor phase mercury contaminants are removed from the exhaust gas. The resulting outlet gas stream leaving the fixed bed substantially free of mercury.

In the preferred embodiment, the fixed bed is located downstream of the electrostatic precipitator or fabric filter 4, and the spray absorber 5. The position of the fixed bed in the preferred embodiment allows the removal of flyash, particulate matter, and gaseous constituents, including some mercury, prior to exposing the flue gas to the gettering composition in the fixed bed 6. Mercury present in the flue gas is adsorbed on the surface of the activated montmorillonite.

The fixed bed apparatus 6 is located in an otherwise conventional coal combustion system. Alternatively, the fixed bed can be located anywhere in the duct work, such that mercury removal is optimized. Several other apparatuses configured to treat the flue gas may be situated upstream or downstream the fixed bed apparatus in the flue gas line 3.

FIG. 1 shows the chamber 6 containing the fixed bed preferably located downstream of a coal combustion unit 1 and conventional flue gas treatment systems, including a cooling unit 2, an electrostatic precipitator (ESP) or a fabric filter 4, and a spray absorber 5 in the flue gas line 3.

The flue gas leaves the coal combustion unit 1 at temperature of 800 to 1200° C. The exhaust may then flow through a cooling unit 2, which cools the flue gas to a temperature of 200-300° C.

The cooled flue gas then flows into an ESP or fabric filter 4, which substantially removes fly ash and particulate matter from the flue gas, leaving gaseous contaminants in the flue gas.

The flue gas is then exposed to a spray absorber 5, configured to remove persistent particulate matter as well as acidic gas pollutants, such as $SO_2$, HCl, and HF. The flue gas may be further cooled in the spray absorber 5, which exposes the flue gas to an aqueous solution. The exhaust gases leaving the spray absorber is substantially free from particulate matter and acidic gas pollutants. Water evaporation in the spray absorber cools the exhaust gas is cooled to a temperature of about 700-140° C. Preferably, the exhaust gas is cooled to a temperature of 70°-90° C. The cooling and dedusting of the combustion exhaust gas and the removal of the gaseous acid pollutants are known in the art.

The exhaust gases then flow through the chamber 6 containing the fixed bed containing activated montmorillonite clay. The exhaust contacts the activated montmorillonite clay at a temperature of about 70°-140° C., more preferably a temperature of 70°-90° C. to maximize the efficiency of mercury adsorption. The purified exhaust gas then leaves the fixed bed substantially free from mercury contaminants. The exhaust gas is subsequently discharged through a stack into the atmosphere.

This invention can be applied to removing mercury from the exhaust gases of many types of industrial and combustion processes. Such combustion processes may be carried out, for example, in circulating or bubbling fluidized bed reactors, in pulverized fuel combusting plants, or in waste incinerators.

Although certain example methods, apparatus and articles of manufacture have been described herein, the scope of coverage of this patent is not limited thereto. On the contrary, this patent covers all methods, apparatus and articles of manufacture fairly falling within the scope of the appended claims.

What is claimed is:

1. A method of removing mercury from a gas stream comprising:
   introducing the gas stream into a flue or duct; and
   contacting the gas stream with a gettering composition comprising a montmorillonite clay and an activator comprising one or more organic cations.

2. The method of claim 1, wherein mercury in the gas stream adsorbs to the gettering composition.

3. The method of claim 2, wherein the gettering composition is in a chamber in the flue or duct.

4. The method of claim 3, wherein the chamber comprises a fixed bed apparatus containing the gettering composition.

5. The method of claim 4, further comprising cooling the gas stream to a temperature of about 70° C. to about 90° C. prior to contacting the gas stream with the gettering composition.

6. The method of claim 2, further comprising oxidizing the mercury prior to contacting the gas stream with the gettering composition.

7. The method of claim 1, wherein the gas stream comprises combustion gas(ses) from a coal combustion unit.

8. The method of claim 1, further comprising exposing the gas stream to a wet scrubber after contacting the gas stream with the gettering composition.

9. The method of claim 1, further comprising cooling the gas stream to a temperature of about 70° C. to about 140° C. prior to contacting the gas stream with the gettering composition.

10. The method of claim 1, wherein the gettering composition comprises more than 5% by weight of the montmorillonite clay.

11. The method of claim 10, wherein the gettering composition comprises at least 10% by weight of the montmorillonite clay.

12. The method of claim 1, wherein the one or more organic cations comprise compounds selected from the group consisting of an L-cysteine ethyl ester cation, an L-cysteine dimethyl ester cation, and a thiamine cation.

13. The method of claim 1, further comprising generating the gas stream by burning coal.

14. A gettering composition comprising:
    montmorillonite clay; and
    an activator comprising one or more organic cations containing a compound selected from the group consisting of an L-cysteine ethyl ester cation, an L-cysteine dimethyl ester cation, and a thiamine cation.

15. The composition of claim 14, wherein the activated montmorillonite clay adsorbs gaseous mercury.

16. The composition of claim 14, wherein the gettering composition comprises more than 5% by weight of the montmorillonite clay.

17. The composition of claim 16, wherein the gettering composition comprises at least 10% by weight of the montmorillonite clay.

18. The composition of claim 14, wherein the activated montmorillonite clay adsorbs gaseous mercury from coal combustion gas(ses).

19. The composition of claim 14, wherein the montmorillonite clay comprises particulate montmorillonite clay having a particle size of about 10-50 micrometers.

* * * * *